April 29, 1969  R. ROMANO  3,441,077
PLEATER TAPE DRAPERY HOOK AND CLIP
Original Filed Aug. 24, 1964  Sheet 2 of 4
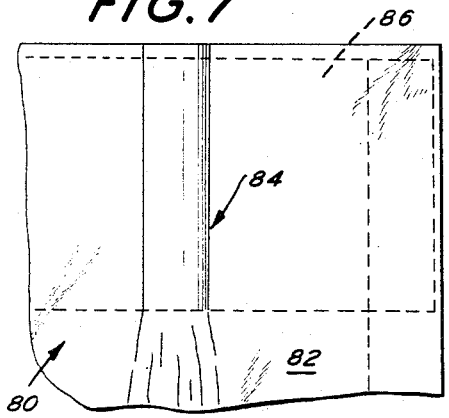
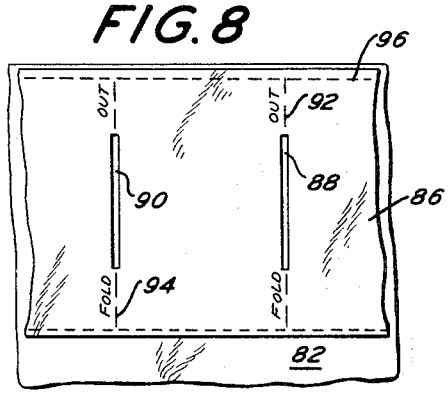
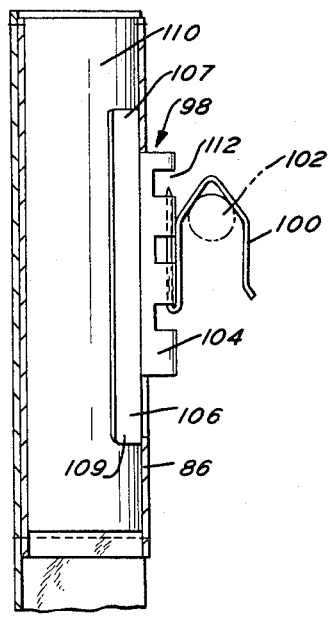
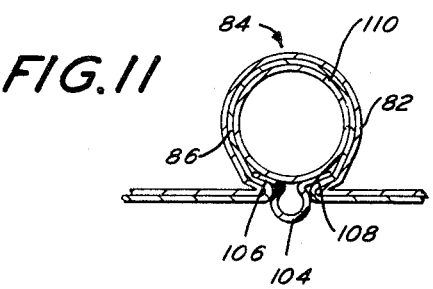
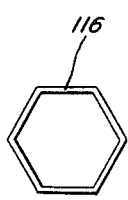
INVENTOR
RALPH ROMANO
BY *Seidel & Gonda*
ATTORNEYS.

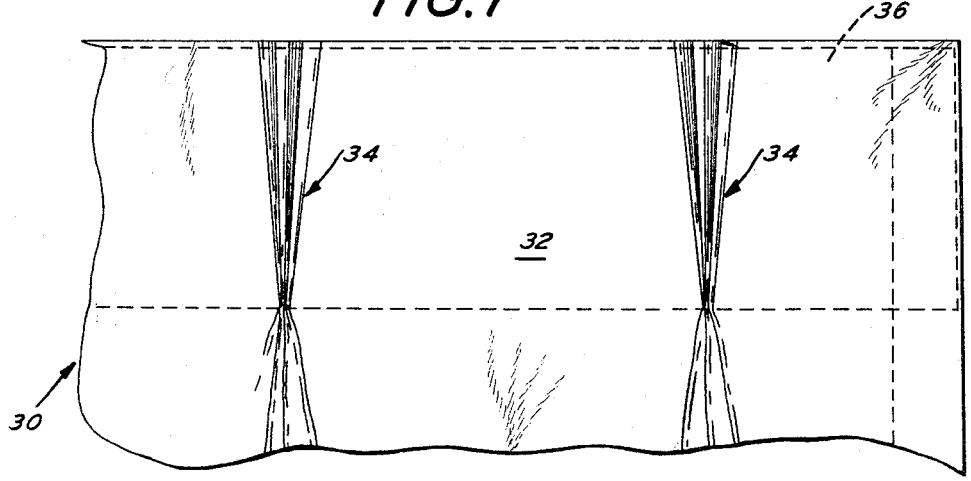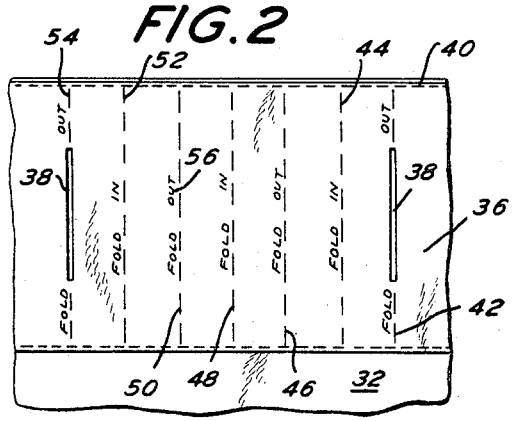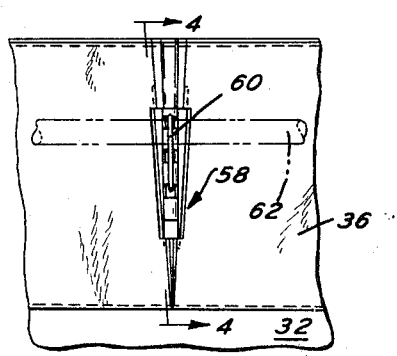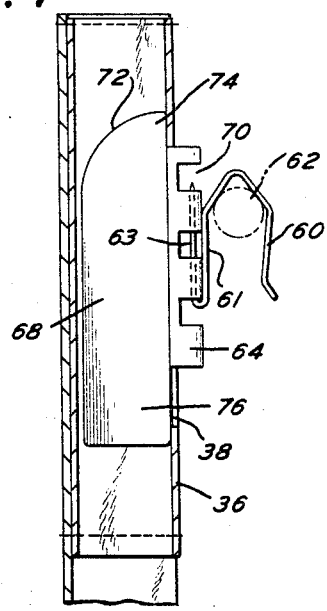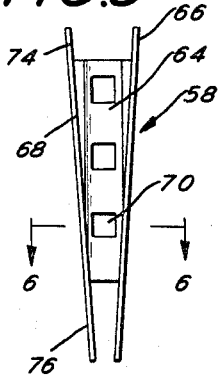
INVENTOR
RALPH ROMANO
ATTORNEYS.

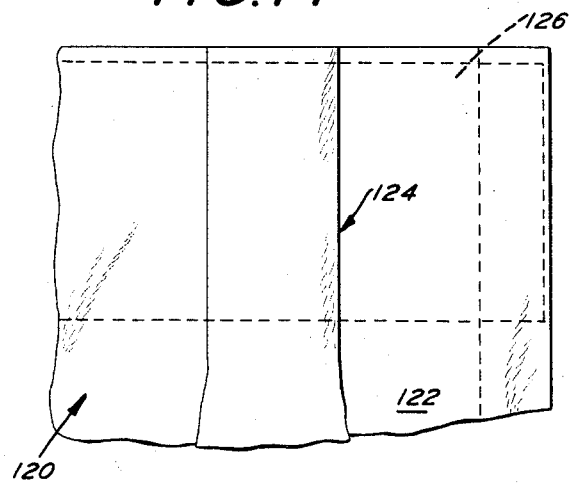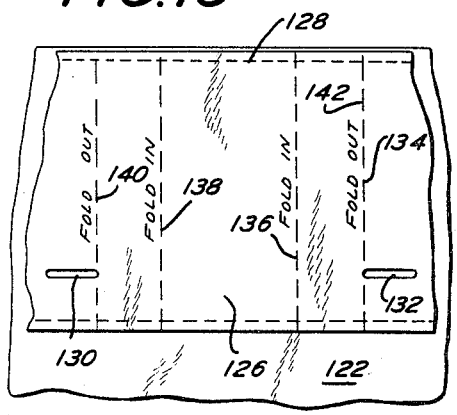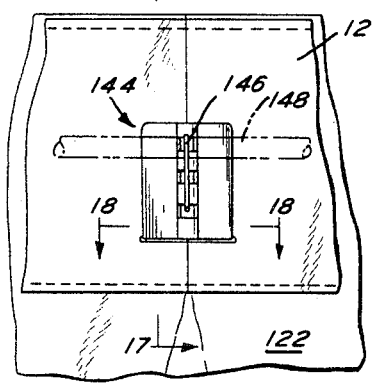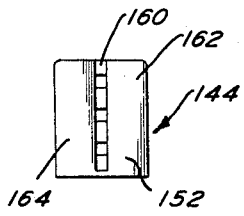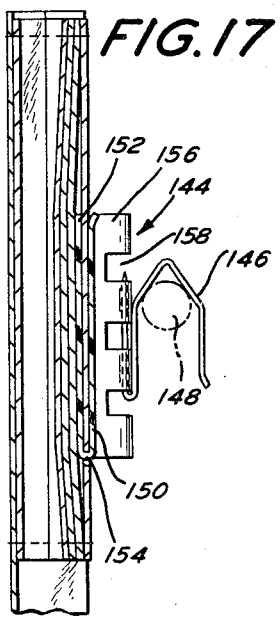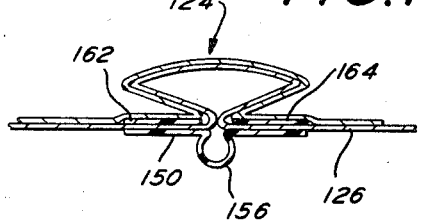

April 29, 1969          R. ROMANO          3,441,077

PLEATER TAPE DRAPERY HOOK AND CLIP

Original Filed Aug. 24, 1964          Sheet 4 of 4

INVENTOR
RALPH ROMANO

BY Seidel & Gonda

ATTORNEYS.

United States Patent Office 3,441,077
Patented Apr. 29, 1969

3,441,077
PLEATER TAPE DRAPERY HOOK AND CLIP
Ralph Romano, Levittown, Pa., assignor of ten percent each to Harold B. Lipsius and Arthur H. Seidel, both of Philadelphia, Pa.
Continuation of application Ser. No. 391,610, Aug. 24, 1964. This application Nov. 21, 1967, Ser. No. 684,876
Int. Cl. A47h *13/01, 13/14*
U.S. Cl. 160—348                                                    10 Claims

ABSTRACT OF THE DISCLOSURE

Apparatus is disclosed for forming a drapery pleat, the apparatus including a drapery clip having a pair of opposed spaced-apart legs and a web connecting the legs. The legs are received within a pair of adjacent slots in a pleater tape secured to the back of a drapery fabric, thereby maintaining therebetween a pleated portion of the fabric.

---

This application is a continuation of application Ser. No. 391,610, filed Aug. 24, 1964, now abandoned.

This invention relates to a novel pleater tape, drapery hook and clip, and more particularly, a pleater tape, drapery hook and clip which are adapted to aid in the formation of pleats in a drapery fabric and which retain the shape of the formed pleats.

It is conventional to form a pleat in a drapery fabric to enhance its overall appearance. These pleats are formed by bunching the material at spaced points along the top of the fabric. The pleats are usually stitched in order to maintain their shape. Hence, when it is desired to clean the drapery fabric, it is necessary to undo the stitching and the formed pleats. This comprises a laborious and time-consuming effort.

In order to overcome the difficulties in forming pleats in drapery fabrics, the use of a pleater tape, drapery hook and clip has been proposed. The tape is sewn directly to the back of the drapery fabric. The hook and clip are inserted within the pleater tape in such a manner so that the fabric can be bunched about the hook and clip to form the requisite pleat.

Conventional pleater tapes, drapery hooks and clips are designed so that only a limited number of different types of pleats may be formed in the fabric. Further, it has been found that the pleats do not retain their shape and become unappealing to the eye of an observer. The drapery hooks and clips are cumbersome to manipulate and have sharp points which often result in injury to the user.

Accordingly, it is an object of the present invention to provide a novel pleater tape, drapery hook and clip.

Another object of this invention is to provide a pleater tape, drapery hook and clip wherein different shapes of pleats may be formed in a drapery fabric.

A still further object of this invention is to provide a pleater tape, drapery hook and clip wherein the clips are contoured so as to insure that the folded pleats are held snugly in place and retain their shape.

Another object of this invention is to provide a pleater tape, drapery hook and clip wherein the clip is designed for ease of insertability into the pleater tape.

A still further object of this invention is to provide a pleater tape, drapery hook and clip, wherein the clip is designed to facilitate its manipulation and is further characterized by the absence of sharp points which may results in harm to the user.

Yet another object of this invention is to provide a pleater tape and draper clip for use with conventional drapery hooks.

A still further object of this invention is to provide a pleater tape and drapery clip for mounting a conventional drapery hook at selectively adjustable elevations.

A more specific object of this invention is to provide a pleater tape, drapery hook and clip for forming a pinch type pleat.

Another specific object of this invention is to provide a pleater tape, drapery hook and clip for forming a contemporary type pleat.

Another specific object of this invention is to provide a pleater tape, drapery hook and clip for forming a cartridge type pleat.

Another specific object of this invention is to provide a pleater tape, drapery hook and clip for forming a box type pleat.

Other objects will appear from the disclosure which follows hereinafter.

The foregoing and other objects of this invention are realized by an apparatus comprising a drapery clip having a pair of spaced-apart planar legs, and a web connecting the legs. The legs are adapted to be received within a pair of adjacent slots in the pleater tape, coupled to a drapery fabric. The clip is provided with at least one aperture before receiving a drapery hook. Thus, the legs of the clip maintain the drapery fabric in a pleated condition, and the clip provides a means whereby the entire drapery may be supported.

For the purpose of illustrating the invention, there are shown in the drawings forms which are presently preferred; it being understood, however, that this invention is not limited to the precise arrangements and instrumentalities shown.

FIGURE 1 is a fragmentary view in elevation of the front of a drapery fabric including pinch type pleats formed by the pleater tape, drapery hook and clip of the present invention.

FIGURE 2 is a fragmentary view in elevation of the rear of the drapery fabric illustrated in FIGURE 1, prior to the formation of the pinch type pleat.

FIGURE 3 is a view similar to FIGURE 2 but illustrating the drapery fabric after the formation of the pinch type pleat by the use of a pleater tape, drapery hook and clip comprising one embodiment of the present invention.

FIGURE 4 is a cross-sectional view taken substantially along the plane indicated by the line 4—4 of FIGURE 3.

FIGURE 5 is a front elevational view of a drapery clip used in the formation of the pinch type pleat illustrated in FIGURE 1.

FIGURE 6 is a cross-sectional view taken substantially along the plane indicated by the line 6—6 of FIGURE 5.

FIGURE 7 is a fragmentary view in elevation of the front of a drapery fabric embodying a cartridge type pleat formed with the pleater tape, drapery hook and clip of the present invention.

FIGURE 8 is a fragmentary view in elevation of the rear of the drapery fabric illustrated in FIGURE 7, prior to the formation of the cartridge type pleat.

FIGURE 9 is a view similar to FIGURE 8 but illustrating the rear of the drapery fabric after the formation of the cartridge type pleat by the use of a second embodiment of a pleater tape, drapery hook and clip comprising the subject of the present invention.

FIGURE 10 is a cross-sectional view taken substantially along the plane indicated by the line 10—10 of FIGURE 9.

FIGURE 11 is a cross-sectional view taken substantially along the plane indicated by the line 11—11 of FIGURE 9.

FIGURE 12 is a top plan view of another type of cartridge which may be used in the formation of a cartridge pleat.

FIGURE 13 is a top plan view of still another type of cartridge which may be used in the formation of a cartridge pleat.

FIGURE 14 is a fragmentary elevational view of the front of a drapery fabric having a box type pleat formed with a pleater tape, drapery hook and clip comprising the subject matter of the present invention.

FIGURE 15 is a fragmentary view in elevation of the rear of the drapery fabric illustrated in FIGURE 14, prior to the formation of the box type pleat.

FIGURE 16 is a view similar to FIGURE 15 but illustrating the rear of the drapery fabric after the box type pleat has been formed by the use of a pleater tape, drapery hook and clip comprising still another embodiment of the present invention.

FIGURE 17 is a cross-sectional view taken substantially along the plane indicated by the line 17—17 of FIGURE 16.

FIGURE 18 is a cross-sectional view taken substantially along the plane indicated by the line 18—18 of FIGURE 16.

FIGURE 19 is a rear view in elevation of the drapery clip used in the formation of the box pleat.

Figure 20:
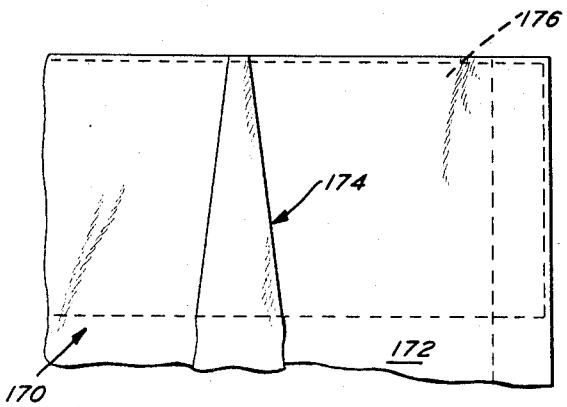
FIGURE 20 is a fragmentary view in elevation of the front of a drapery fabric formed with a contemporary type pleat by means of the pleater tape, drapery hook and clip comprising the subject matter of the presnt invention.
Figure 21:
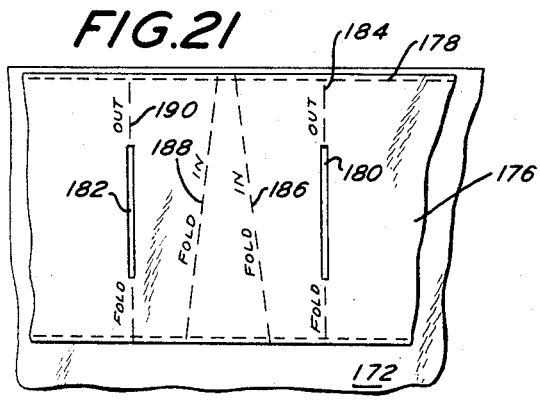
FIGURE 21 is a fragmentary elevational view of the rear of the drapery fabric illustrated in FIGURE 20 prior to the formation of the contemporary type pleats.
Figure 22:
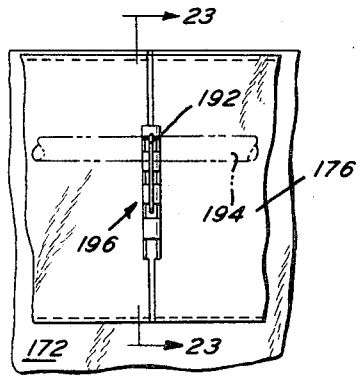
FIGURE 22 is a view similar to FIGURE 21 but illustrating the rear of the drapery fabric after the formation of the contemporary type pleat by means of a pleater tape, drapery hook and clip comprising still another embodiment of the present invention.

Referring now to the drawings in detail, and more particularly to FIGURES 1–6, a pair of drapes are generally indicated by the numeral 30. The drapes 30 including fabric 32 are formed with a plurality of spaced pinch pleats 34.

In order to form the pinch pleats 34, a pleater tape 36 is provided. The pleater tape 36 is stitched as indicated at 40 to the back of the drapery fabric 32 adjacent its top edge. The pleater tape 36 is provided with a repeating series of fold lines at spaced intervals along the tape. As illustrated in FIGURE 2, the pleater tape 36 is provided with fold lines 42, 44, 46, 48, 50, 52 and 54. The fold lines may comprise creases, score lines, or perforations. Adjacent to each fold line is printed indicia 56. The indicia 56 provides instructions for forming the pinch pleat 34. As outlined in FIGURE 2, the fold line 54 is folded out towards the back of the fabric 32. Each preceding fold line is alternately folded in and out as directed. The result is the formation of three accordion-like folds.

The conventional pinch pleat 34 flares outwardly towards the top of the drapery fabric 32. This is clearly indicated in FIGURE 1. That is, the fabric is pinched at the bottom of the pleat.

In order to retain the folds of the pleat in their accordion-like array, as well as pinching the pleat at its bottom end so that it flares upwardly, a drapery clip generally designated by the numeral 58 is provided. The clip 58 includes a substantially U-shaped body portion having a pair of opposed planar legs 66 and 68 of the same overall peripheral configuration joined by a web 64.

The legs 66 and 68 are longer than the web 64 and hence include a top porition 74 projecting beyond one end of the web and a bottom portion 76 projecting beyond the other end of the web. The top edge of each of the legs 66 and 68 is arcuate as indicated at 72. Further, the legs 66 and 68 converge towards their ends 76.

A plurality of apertures 70 are formed along and through the web 64. The series of apertures 70 are in line and each one of them communicates with the space between the legs 66 and 68.

A slot 38 is formed along each of the fold lines 42 and 54. After the pleater tape 36 and drapery fabric 32 have been folded as indicated in FIGURE 2, the legs 66 and 68 of the clip 58 are inserted into the adjacent slots 38. The arcuate top edge 72 of each leg facilitates the insertion.

The lower portions 76 of legs 66 and 68 are first inserted in slots 38. The clip is then slid slightly downwardly to substantially completely position the bottom portions 76 of each leg behind the pleater tape. Then the top part 74 of each leg is positioned adjacent the top of the slots 38 and rotated about a horizontal axis. The arcuate top edges 72 guide the movement of the clip past the top of slots 38. Since the pleater tape is flexible, this may be readily accomplished. When the top portion 74 of each leg is behind the pleater tape 36, the whole clip 58 is slid upwardly and the bottom sections of portions 76 of each leg seats behind the pleater tape 36. Thus assembled, the accordion-like folds of the pleat are retained between the legs 66 and 68 and the tape and drape are supported by the cilp. It is necessary to follow the above procedure (i.e., insert the lower portions 76 of legs 66 and 68 first) when installing clip 58 in the slots of the tape since the distances from the tap of web 64 to the bottoms of legs 66 and 68 are greater than the slots 38. Insertion of the upper portion 74 of the legs 66, 68 would result in it being practically impossible to move the lower portions 67 of legs 66 and 68 through the slots 38. Insertion of the legs of clip 58 into the slots 38 in the manner described above is made possible by the fact that the distances from the bottom of web 54 to the tops of portions 74 of legs 66 and 68 are less than the length of the slots 38.

As seen in FIGURES 4 and 6, the web 64 is substantially semi-circular in cross section. Hence, when the clip is positioned behind the pleater tape 36, the web 64 projects outwardly from the pleater tape. This prevents clip 58 from falling vertically to any appreciable extent. However, the frictional engagement between the legs of clip 58 and the pleater tape 36 is sufficient to retain the clip in place. Since the web 64 projects outwardly from the plane of the pleater tape 36 and drapery fabric 32, it is readily accessible.

A conventional drapery hook 60 is adapted to be inserted through one of the apertures 70 into the web 64 and slid upwardly. The portions 61 and 63 of the drapery hook 60, being resilient, are frictionally held between the inside and outside surface of the web 64. The hook 60 may then be disposed upon a conventional drapery rod 62.

Since the clips 58 are all of the same size and the apertures 70 are positioned at the same vertical elevation, the drapery fabric 32 will be at a uniform elevation when hung on the rod 62. If desired, the vertical elevation of the drapery fabric may be adjusted by simply re-positioning the drapery hooks 60 through a higher or lower aperture 70.

Since the legs 66 and 68 converge towards the bottom part 76 of each leg, the folds of the pleats are closer together at the bottom of the pleat than at the top. In this manner, the clip 58 pinches the folds to form the pinch pleat 34. The folds cannot spread because they are confined by the legs 66 and 68. The clip 58 also does away with the need of threading each drapery hook 60 through the fabric material 32. This provides a neat and attractive appearance as well as alleviating a dangerous condition wherein the person who threaded the hooks could be stuck with the pointed end of the hook portion 63.

Referring now to FIGURES 7-13, a pair of drapes 80 are illustrated which include a fabric 82 having a cartridge type pleat 84. The pleat 84 is formed by using a pleater tape 86 stitched as indicated at 96 to the back of the drapery fabric 82 adjacent its top edge. The pleater tape 86 includes spaced series of fold lines 92 and 94. The indicia adjacent the fold lines specifies that they are to be folded outwardly. A slot 88 and a slot 90 are formed along the fold lines 92 and 94 respectively.

In forming cartridge pleat 84, a clip generally designated by the numeral 98 is employed. The clip 98 includes a substantially U-shaped body portion having a pair of opposed planar legs 106 and 108 joined by a web 104. The legs 106 and 108 have the same overall peripheral configuration and includes a top part 107 projecting beyond the top of the web 104 and a bottom part 109 projecting downwardly beyond the bottom of the web 104. The legs 106 and 108 flare or diverge outwardly from a medial plane through the web 104. The bottom parts 109 of legs 106 and 108 are longer than the top parts 107 of legs 106 and 108 similarly as the bottom portions 76 and top portions 74 of legs 66 and 68 of clip 58 depicted in FIGURES 3, 4, 5 and 6. Clip 98 is assembled with the tape 86 in the same manner as clip 58 is assembled with tape 36.

The web 104 also includes a plurality of aligned and vertically spaced apertures 112 in communication with the space between the legs.

After the pleater tape 86 and drapery fabric 82 have been folded as specified along the lines 92 and 94, the legs 106 and 108 of the clip 98 are manipulated through the slots 90 and 88 respectively to position the legs behind the pleater tape. A cartridge such as a hollow cylindrical member 110 is placed between the oppositely flared legs 106 and 108 and the pleater tape 86. The legs 106 and 108 abut the cartridge 110 and hold it snugly up against the pleater tape 86.

The web 104 is substantially semi-circular in cross section and projects outwardly from the back of the pleat. A drapery hook 100 is adapted to be positioned within the apertures 112 in a manner similar to the drapery hook 60. The drapery fabric can then be hung upon a drapery rod 102. Since a series of apertures 112 are formed, the placement of the pin may be varied so as to vary the elevation of the drapery fabric 82 when it is hung.

In lieu of the cylindrical cartridge 110, a triangularly-shaped cartridge 114, or a hexagonally-shaped cartridge 116 may be employed.

Referring now to FIGURES 14-19, a pair of drapes generally designated by the numeral 120 including drapery fabric 122 is provided with a box type pleat 124.

The box type pleat 124 is formed by use of a pleater tape as indicated by the numeral 126 stitched at 128 to the top edge of the back of the drapery fabric 122. The pleater tape 126 is provided with a plurality of series of fold lines 134, 136, 138 and 140. By folding the pleater tape 126 and drapery fabric 122 along the fold lines as directed by the indicia 142 adjacent each of the fold lines, a pleat having the shape as generally indicated in FIGURE 18 is formed. The pleat flares outwardly and is connected by a substantially arcuate portion of the drapery fabric 122.

In order to retain the shape of the pleat 124, a clip generally designated by the numeral 144 is provided. The clip 144 includes a body portion which is substantially U-shaped having a pair of planar, parallel legs 150 and 152 joined by a substantially semi-circular web 154. The legs 150 and 152 generally have the same overall peripheral configuration. The leg 152 has an elongated slot 160 along its length. The slot 160 divides the leg 152 into two halves 162 and 164.

Opposite the slot 160, the leg 150 is provided with a substantially semi-circular projection 156 along its entire length. The projection 156 includes a series of spaced apertures 158 is communication with the space between the legs.

The pleater tape 126 is provided with spaced horizontal slots 130 and 132 adjacent to fold lines 140 and 134 respectively. After the pleater tape 126 and fabric 122 have been folded, the leg halves 162 and 164 are inserted within the slots 130 and 132 respectively. The pleated tape 126 is frictionally caught between the legs 150 and 152. Hence, the shape of the box pleat 124 is maintained, as the pleater tape 126 and fabric 122 cannot be unfolded since they are locked in place by the clip 144.

The drapery hook 146 may be inserted behind the projection 156 by insertion through any one of the apertures 158. The hook 146 may then be hung upon a suitable drapery rod 148. As in the previous embodiment discussed, the vertical elevation of the drapery fabric 122 may be adjusted by re-positioning the hook 146 through a higher or lower apertures 158.

Referring now to FIGURES 20-24, a pair of drapes 170 is illustrated. The drapes 170 include the drapery fabric 172 having a series of contemporary pleats 174.

Figure 23:
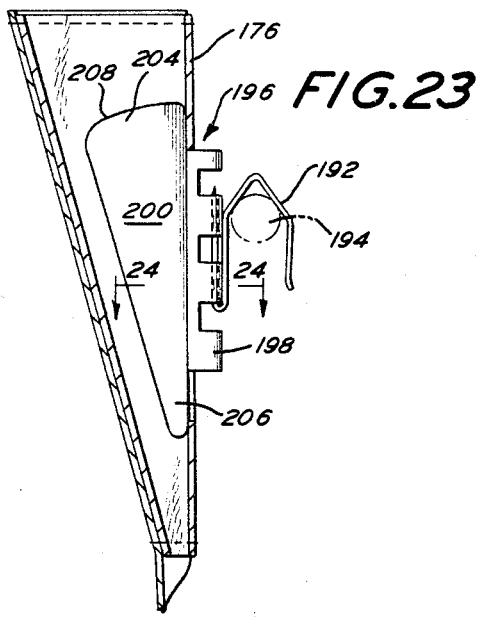
FIGURE 23 is a cross-sectional view taken substantially along the plane indicated by the line 23—23 of FIGURE 22.
Figure 24:
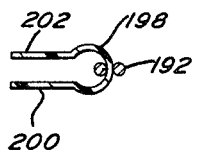
FIGURE 24 is a cross-sectional view taken substantially along the plane indicated by the line 24—24 of FIGURE 23.

The pleats 174 are formed by the use of a pleater tape 176 stitched to the top edge of the drapery fabric 172. The pleater tape 176 includes a plurality of series of fold lines 184, 186, 188, and 190. When the pleater tape 176 and drapery fabric 173 are folded as indicated by the indicia adjacent each fold line, the contemporary pleat 174 is formed. As seen in FIGURE 23, the pleat is wider at its top end than at its bottom end and is in the form of a truncated pyramid.

In order to retain the shape of the pleat 174, a clip generally designated by the numeral 196 is provided. The clip 196 has a substantially U-shaped body portion including a pair of opposed planar legs 200 and 202 joined by a web 198. The legs 200 and 202 include a top portion 204 extending beyond the top of the web 198 and a bottom portion 206 extending below the bottom of the web 198. The web 198 is generally semi-circular and includes a plurality of apertues 193 is spaced vertical alignment. The top portion 204 of each leg terminates in an arcuate edge 208. The top portion 204 of each leg is substantially wider than the opposite terminal portion 206. Clip 196 is assembled with tape 176 in the same manner as clip 58 is assembled with tape 36.

The pleater tape 176 is also provided with a pair of parallel, vertically extending slots 180, 182, along the fold lines 184 and 190 respectively. After the pleater tape 176 and 172 have been folded, the legs 200 and 202 of the clip 196 are inserted within the slots 182, 180 respectively. The folds of the pleat 174 are retained between the legs. The top portion of the legs being wider than the bottom portion of the legs enables the clip to conform generally to the shape of the pleat 174 and to retain more fabric between the legs at the top than at the bottom. This provides the requisite support to maintain the pleat in the shape illustrated.

After the clip has been inserted within the slots 180 and 182, a drapery hook 192 may be positioned through any one of the apertures 193 and hung upon a drapery rod 194. The provision of the plurality of spaced apertures 193 allow for adjustment of the vertical elevation of the drapery fabric 172.

The clip 196 is inserted within the slots 180, 182 in a similar manner as the slip 58 is inserted within the slots 38. Hence, the top portion 204 and bottom portion 206 of each of the legs of the clip 196 seat behind the pleater tape in snug frictional engagement.

Each of the clips 58, 98, 144, and 196 are adapted to be constructed from non-corrosive plastic material, if desired. These clips are lightweight and durable.

It is claimed:

1. Apparatus for forming a drapery pleat and for receiving a drapery hook comprising a pleater tape for securement to the back of a drapery fabric, spaced vertical, parallel slots along the length of said tape, a drapery clip, said clip having a substantially U-shaped configuration, said clip including a pair of opposed planar legs having substantially the same overall peripheral configuration and being spaced apart for receiving drapery fabric therebetween to form a pleat, a web connecting said legs, said legs being received within a pair of adjacent slots in said pleater tape to retain the shape of a pleat formed in said tape and drapery fabric between said slots, and at least one aperture in said web of said said clip in communication with the space between the legs of said clip and adapted to receive a drapery hook.

2. Apparatus for forming a drapery pleat and for receiving a drapery hook comprising a pleater tape for securement to the back of a drapery fabric, spaced, vertical, parallel slots along the length of said tape, a drapery clip, said clip having a substantially U-shaped configuration, said clip including a pair of opposed legs having substantially the same overall peripheral configuration and being spaced apart, a web connecting said legs, said legs projecting beyond both ends of said web, said legs projecting downwardly beyond said web a greater distance than they extend upwardly beyond said web, said legs being received in a pair of adjacent slots in said pleater tape to retain the shape of a pleat formed between said slots in said tape and drapery fabric, the ends of said legs projecting beyond said web seating behind said pleater tape.

3. Apparatus in accordance with claim 2 wherein at least one aperture is provided in said web adapted to receive a drapery hook.

4. Apparatus in accordance with claim 2 wherein the legs of said clip flare outwardly from a medial plane through the clip web, and a cartridge is supported between said legs and the portion of said pleater tape between said slots.

5. Apparatus in accordance with claim 2 wherein one end of the legs of said clip is arcuate, said arcuate end of said legs being wider than its other end.

6. Apparatus in accordance with claim 2 wherein one end of the legs of said clip is arcuate, and said legs converge away from said arcuate end to pinch a portion of said pleater tape therebetween.

7. A clip for use with a drape having a substantially U-shaped configuration and including a pair of opposed legs having substantially the same overall peripheral configuration and being spaced apart, said clip further including a web interconnecting said legs, said clip being adapted to cooperate with a drape to retain the shape of a pleat formed therein, said legs projecting beyond both ends of said web, top portions of said legs extending above the top of said web and bottom portions of said legs extending below the bottom of said web, said bottom portions of said legs being substantially longer than said top portions of said legs, and at least one aperture in said web.

8. A clip in accordance with claim 7 wherein a plurality of aligned, spaced apertures are provided in said web, a drapery hook, said drapery hook having resilient web engaging portions thereon, one of said web engaging portions being inserted into one of said apertures, and said web engaging portions engaging the inner and outer surface of said web, each aperture communicating with the space between the legs.

9. A clip in accordance with claim 7 wherein at least one end of said opposed legs is arcuately shaped and said web is substantially semi-circular in cross section.

10. A clip in accordance with claim 7 wherein a plurality of aligned, spaced apertures are provided in said web, and said legs converge toward each other.

References Cited

UNITED STATES PATENTS

| | | | |
|---|---|---|---|
| 1,037,666 | 9/1912 | Rogers. | |
| 1,166,174 | 12/1915 | Bisbee. | |
| 1,711,304 | 4/1929 | Beste | 160—348 |
| 2,181,813 | 11/1939 | Kaufman | 160—348 |
| 2,271,250 | 1/1942 | Buchholz | 248—316.5 X |
| 2,523,785 | 9/1950 | Sereno. | |
| 2,544,516 | 3/1951 | Walters | 160—348 |
| 2,685,113 | 8/1954 | Roeckel | 160—348 X |
| 2,718,923 | 9/1955 | Moser | 160—348 |
| 2,765,844 | 10/1956 | Kuddes | 160—348 |
| 2,775,295 | 12/1956 | Williford et al. | 160—348 |
| 2,809,694 | 10/1957 | Southwell et al. | 160—348 |
| 2,822,869 | 2/1958 | Shayman | 160—348 |
| 2,978,735 | 4/1961 | Petzal | 160—348 X |
| 2,996,117 | 8/1961 | Roberts | 160—348 |
| 3,081,819 | 3/1963 | Lydard | 160—348 |
| 3,198,244 | 8/1965 | Mairson | 160—348 |
| 3,205,549 | 9/1965 | Keech | 24—243 X |
| 3,261,065 | 7/1966 | Romano | 160—348 X |

DAVID J. WILLIAMOWSKY, *Primary Examiner.*

P. C. KANNAN, *Assistant Examiner.*

U.S. Cl. X.R.

16—87.2